United States Patent [19]

Epper et al.

[11] 4,401,564
[45] Aug. 30, 1983

[54] DEVICE FOR AFFIXING A FILTER MESH TO THE DRUM OF A ROTARY DRUM FILTER

[75] Inventors: Wolfgang Epper, Gergheim; Lothar Michalski, Wiehl; Peter Schonteich, Cologne, all of Fed. Rep. of Germany

[73] Assignee: Klockner-Humboldt-Deutz AG, Fed. Rep. of Germany

[21] Appl. No.: 327,097

[22] Filed: Dec. 3, 1981

[30] Foreign Application Priority Data

Dec. 24, 1980 [DE] Fed. Rep. of Germany ....... 3048954

[51] Int. Cl.³ ...................... B01D 33/34; B01D 39/08
[52] U.S. Cl. ................................. 210/150; 210/404
[58] Field of Search ............... 210/402, 403, 150, 619, 210/151, 404; 261/92; 162/402, 411

[56] References Cited

U.S. PATENT DOCUMENTS

| | | | |
|---|---|---|---|
| 2,055,251 | 9/1936 | Duvall | 210/404 |
| 2,259,235 | 10/1941 | Weiss | 210/404 |
| 2,567,266 | 9/1951 | Young | 210/404 |
| 3,036,354 | 5/1962 | Petrus de Bie | 210/404 |
| 3,175,691 | 3/1965 | Watson | 210/404 |
| 3,353,675 | 11/1967 | Glos | 210/404 |
| 3,837,499 | 9/1974 | Luthi | 210/404 |
| 3,954,622 | 5/1976 | Kus | 210/404 |

*Primary Examiner*—Charles N. Hart
*Assistant Examiner*—Wanda L. Millard
*Attorney, Agent, or Firm*—Hill, Van Santen, Steadman & Simpson

[57] ABSTRACT

A device for attaching a filter mesh to the drum of a rotary vacuum drum filter has a number of support elements uniformly disposed about the circumference of the drum and extending along the axial length thereof for carrying the filter mesh and forming individual cells beneath the mesh. At least one filter mesh clamping element is provided between adjacent support elements which includes a spacing body attached to the exterior drum wall and a strip disposed thereabove on the filter mesh and a retainer joining the strip and the spacing body. The spacing body has approximately the same height as the support elements so that the filter mesh is not deformed by the attachment.

6 Claims, 2 Drawing Figures

DEVICE FOR AFFIXING A FILTER MESH TO THE DRUM OF A ROTARY DRUM FILTER

BACKGROUND OF THE INVENTION

The present invention relates to devices for affixing a filter mesh to the drum of a rotary vacuum drum filter, and in particular to such devices employing foraminous support elements for carrying the filter mesh which extend in the axial direction along the outside wall of the drum and which are uniformly distributed over the drum circumference.

Means for affixing a filter mesh to the exterior of the drum of a rotary drum filter are known in the art which utilize a number of foraminous support elements which are uniformly spaced around the circumference of the drum and which extend in the axial direction of the drum. The support elements form individual cells between the exterior wall of the drum and the filter mesh and at least one filter mesh clamping element is provided between adjacent support elements. In order to hold the filter mesh in place on the support elements, a fitting strip, which has a wedge-like cross section, is employed as a clamping element. The nearest sides of adjacent support elements form a corresponding wedge for receiving the fitting strip and the fitting strip is thus pressed into this wedge with the filter mesh between the fitting strip and the support elements, thereby holding the filter mesh in place. The filter mesh is greatly deformed at those clamping locations.

Because of the extreme deformation of the filter mesh which results from the above-described conventional filter affixing means, such known means can only be employed with a filter mesh consisting of fabric or some other highly elastic thin material, but cannot be employed with a filter mesh consisting of a metal wire web, as is generally employed for vacuum drum filters.

An attempted solution to employ the known affixing means to a metallic filter mesh, the metallic filter mesh has been cut into individual segments having a width which corresponds to the width of the support elements between the clamping elements so that the metallic mesh extends only partially into the wedge between such supporting elements. Because a separate filter mesh segment is thus required for each support element and a separate fitting strip is required between every two adjacent support elements, this attempted solution for affixing a metallic filter mesh to the drum of a rotary drum filter results in a significantly higher material and assembly time outlay.

It is an object of the present invention to provide a device for affixing a metallic filter mesh to the exterior wall of a rotary drum filter which is economical to assemble and which results in minimal deformation of the metallic filter mesh.

This object is inventively achieved in a device for affixing a metallic filter mesh to the drum of a rotary vacuum drum filter wherein a plurality of spacer elements are respectively disposed between adjacent support elements and are attached to the exterior wall of the drum, and an axially extending strip is disposed over the spacer elements with the metallic mesh disposed therebetween, and the strips are respectively attached to the corresponding spacer elements, thereby affixing the mesh along the surfaces of the supporting elements. The spacer element has approximately the same height as the adjacent support elements, so that the filter mesh can be trained about the exterior surfaces of the support elements and rigidly clamped thereto by means of the axial strips without creasing or substantially deforming the filter mesh. The filter mesh can thus be a relatively stiff metallic mesh and can be trained about the filter drum in one piece.

The support elements have a widened U-shaped cross section so as to form individual cells beneath each support element. In a further embodiment of the invention, the clamping elements alternate between adjacent support elements with a sealing strip which is disposed between two support elements so as to seal the cells formed by each support element.

In a further embodiment of the invention, a support mesh, which is also held in place by means of the clamping elements disposed between adjacent support elements, is disposed between the support elements and the filter mesh. The presence of the support mesh between the support elements and the filter mesh greatly improves the filtration effect of the overall structure.

In another embodiment of the invention the end walls of the support elements are terminated by means of sealing rings. This results in a reliable seal of the cells formed by the support elements as well as sealing the end of the entire filter drum in a relatively simple manner.

DESCRIPTION OF THE PREFERRED EMBODIMENTS

Figure 1:
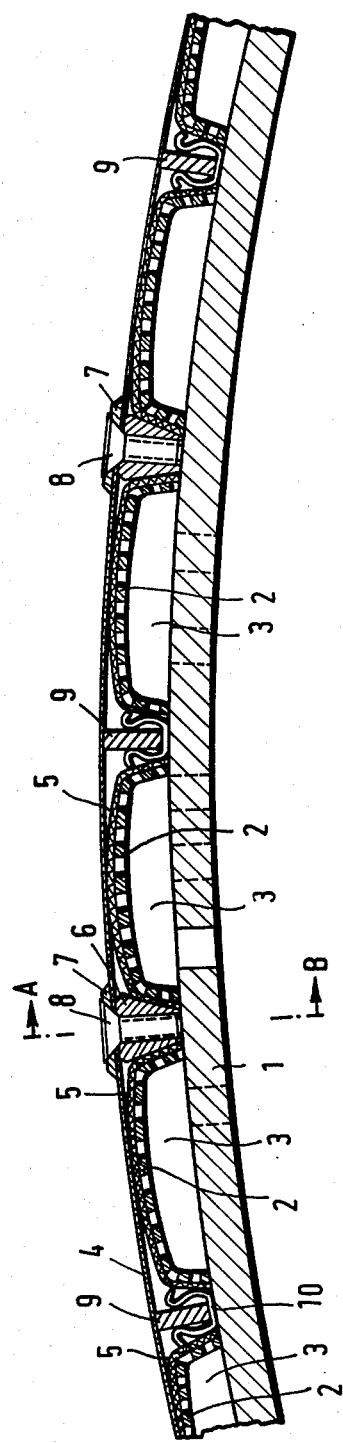
FIG. 1 is a sectional view of a portion of the exterior wall of a rotary vacuum filter drum with support elements and a filter mesh carried thereon with two filter mesh clamping elements and an intervening sealing strip constructed in accordance with the principles of the present invention.

A section of an exterior wall 1 of a rotary vacuum drum filter is shown in FIG. 1 which has a plurality of uniformly spaced foraminous support elements 2 disposed along the outer surface thereof. The support elements 2 have a U-shaped cross section and proceed in the axial direction along the length of the filter drum and are spaced over the entire circumference of the drum. Each support element 2 forms an individual cell 3 between the support element 2 and the drum wall 1. A filter medium 4, such as a metallic filter mesh is trained about the filter drum over the support elements 2. A support mesh 5, which is also trained about the support elements 2, is disposed between the support elements 2 and the filter mesh 4. The support elements 2 and the support mesh 5 can be permanently or releaseably mounted on the drum wall 1. If the support elements 2 are releaseably mounted on the drum wall 1, this provides for a rapid replacement of those elements by means of simply withdrawing an unuseable element 2 in the axial direction of the drum filter and inserting a new support element 2 between the filter drum wall 1 and the filter mesh 4.

In accordance with the principles of the present invention a spacer element 6, which has approximately the same height as the support elements 2, is disposed between adjacent support elements 2, (and between the support mesh 5 carried on each support element 2) and in the radial direction is disposed between the drum wall 1 and the filter mesh 4. A strip 7, which proceeds in the longitudinal or axial direction of the drum, is disposed on the filter mesh 4 directly over the spacer element 6 and is attached to the spacer element 6 by a retainer means 8, which may, for example, be a screw. The retainer means 8 engages a correspondingly shaped receptacle in the central portion of the spacer element 6, which can be a threaded bore if the retainer means 8 is a screw. The spacer element 6 is rigidly mounted to the drum wall 1. Thus the strip 7 and the retainer means 8 affixes the filter mesh 4 to the spacing body 6 and thus to the filter drum wall 1. Because the spacer element 6 have the same height as the support elements 2, the filter mesh 4 is not deformed nor creased at the clamping location and a uniform surface progression of the filter mesh 4 about the filter drum is retained over the entire circumference of the drum. This also provides an increase in the service life of the filter mesh 4. Affixing and replacing the filter mesh 4, particularly metallic filter meshes, can thus be undertaken very quickly and simply by simply removing the retainer means 8 and training a new mesh over the support elements 2.

It is not necessary that a retainer means 8 and a corresponding spacer element 6 be disposed between every pair of support elements 2, and as shown in FIG. 1 the spacer elements 6 may alternate with a sealer strip 9 disposed between every other pair of adjacent support elements 2. The sealing strips 9 are held in place by means of clamping elements 10 having a U-shaped cross section which simultaneously serve as clamping elements for the support mesh 5 and as spacing bodies for the support elements 2. The sealing strip 9 maintains the integrity of the individual cell 3 which is formed beneath each support element 2.

The sealing strips 9, which may consist of metal or of an elastic material, also perform the function of support elements for the filter mesh 4.

Figure 2:
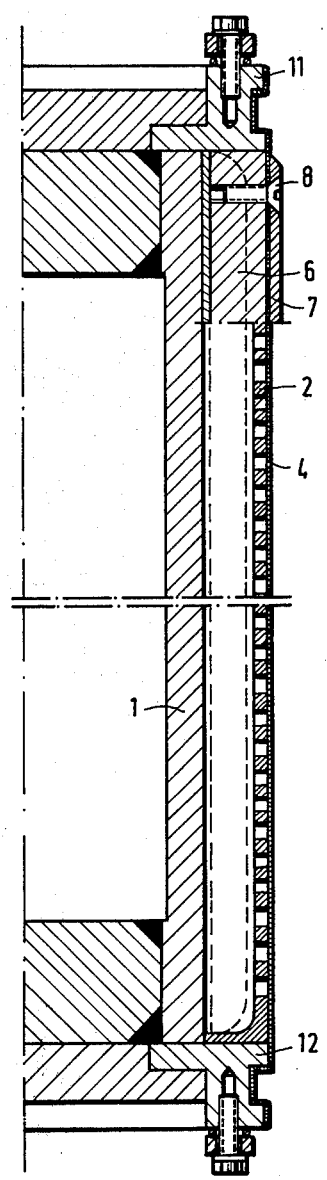
FIG. 2 is a sectional view taken along line A-B of FIG. 1.

As shown in FIG. 2, the end walls of the support elements 2 are tightly sealed to the exterior by means of rings 11 and 12 disposed at each end of the filter drum.

Any number of clamping devices may be employed to clamp the filter mesh 4 to the filter drum as may be required by different operating conditions. Under some conditions, as few as a single clamping device may be sufficient.

Although modifications and changes may be suggested by those skilled in the art it is the intention of the inventors to embody within the patent warranted hereon all changes and modifications as reasonably and properly come within the scope of their contribution to the art.

We claim as our invention:

1. A device for affixing a thick, stiff one-piece filter mesh to the exterior of a drum of a rotary vacuum drum filter, said drum having a plurality of uniformly spaced support elements disposed about the circumference thereof and extending along the axial direction of said rum and forming individual cells beneath each support element, said filter mesh being trained about said support elements, said device comprising:

at least one planar clamping means disposed between at least alternating pair of adjacent support elements, each clamping element including a spacer element disposed between said drum wall and said filter mesh and attached to said drum wall, a strip disposed over said spacer element with said filter mesh disposed in between, and a retainer means for fastening said strip to said spacer element for holding said filter mesh in place without substantial deformation of said filter mesh, said spacer element having a height substantially equal to a height of said support elements.

2. The device of claim 1 further comprising a plurality of sealing strips disposed between adjacent support elements not having said clamping means disposed therebetween.

3. The device of claim 1 further comprising a support mesh which is also held in place by said clamping means and which is disposed between said support elements and said filter mesh.

4. The device of claim 3 further comprising a second clamping means disposed between adjacent pairs of support elements not having said clamping means therebetween, said second clamping means having a U-shaped cross section for holding said support mesh in place on said support elements.

5. The device of claim 4 further comprising a sealing strip held by said second clamping means.

6. The device of claim 1 further comprising a pair of sealing rings respectively disposed at opposite ends of said rotary vacuum drum filter adjacent to said support elements for sealing said cells at the ends thereof.

* * * * *